UNITED STATES PATENT OFFICE.

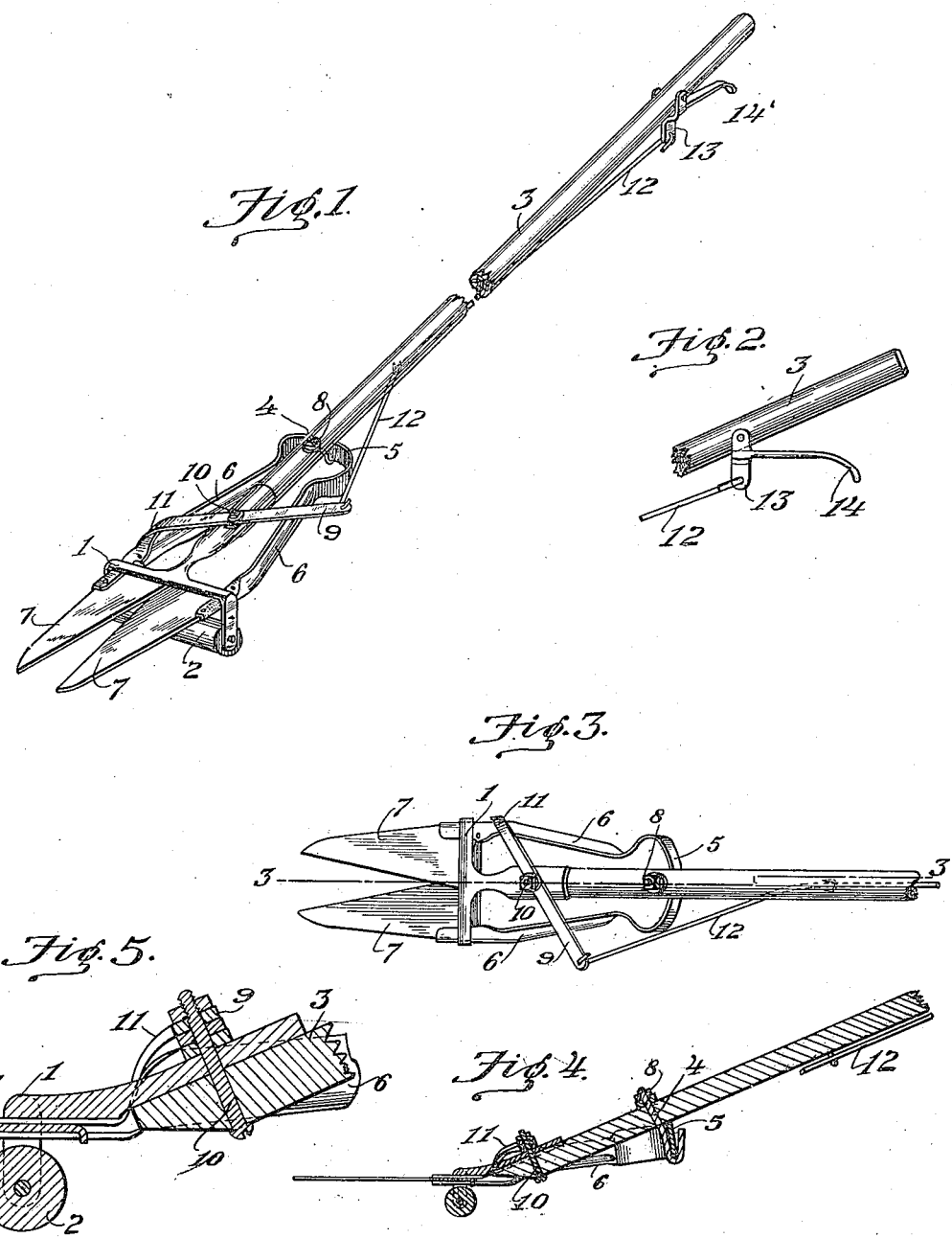

AUGUST HUBERTY, OF CANTON, OHIO.

LAWN-TRIMMER.

1,254,140.

Specification of Letters Patent.   Patented Jan. 22, 1918.

Application filed June 5, 1917.   Serial No. 172,897.

*To all whom it may concern:*

Be it known that I, AUGUST HUBERTY, a citizen of the United States, residing at Canton, in the county of Stark and State of Ohio, have invented a new and useful Lawn-Trimmer, of which the following is a specification.

My invention relates to improvements in lawn trimmers, more especially designed for trimming grass and weeds adjacent to curbings, walls, plants, trees or shrubbery or other places where an ordinary lawn mower cannot be used for the purpose of trimming.

The objects of the present invention are, first, to provide a device wherein ordinary sheep shears can be successfully used, second, to provide a yoke or frame to which a carrier roller is attached and to arrange the blades of the shears between the roller and the yoke, and third, to so attach the shears that they can be easily operated and adjusted to produce the proper shearing effect as the blades are brought toward each other.

These objects, together with other objects readily apparent to those skilled in the art, may be attained by the construction illustrated in the accompanying drawings, although the invention may be embodied in other forms, the construction illustrated being chosen by way of example.

In the accompanying drawing:

Figure 1 is a perspective view showing the different parts properly assembled.

Fig. 2 is a view showing a portion of the handle illustrating the blade actuating lever and rod properly connected together.

Fig. 3 is a top view of a portion of the device.

Fig. 4 is a longitudinal section taken on line 3—3, Fig. 3, except a portion of the actuating rod is illustrated.

Fig. 5 is an enlarged sectional view showing the forward end of the handle and illustrating the parts for attaching the shear actuating lever.

Similar numerals of reference indicate corresponding parts throughout the several figures of the drawings.

In the accompanying drawing 1 represents the yoke which may be substantially of the form shown and is provided with the roller 2, said roller being properly journaled in the yoke. The yoke proper is attached to the handle 3 in any convenient and well known manner, the only object being to so connect the yoke to the handle that a rigid connection is produced. To the handle 3 is attached the shear carrying hook or draw bolt 4, which hook or draw bolt is so formed that it will embrace the spring portion 5 of the shear blade arms 6, to which arms are formed integral or attached the shear blades 7. The detail construction of the shears so far as the present invention is concerned is immaterial. It is well understood that when shears of the kind shown are held in the hand of the operator and the blades brought to and from each other, the proper pressure can be produced to prevent any springing action to or from the cutting edges of the shear blades. However, when the shear blades are operated by mechanism it is important that some means are provided whereby the shear blades can be held in proper relationship with reference to each other, so that as the cutting edges of the blades are brought together the proper shearing action will be produced. In order to provide for the proper shearing action the draw bolt 4 is curved or bent so that as it is drawn endwise by the nut 8 it will have a tendency to force the shear blades upward or against the under side of the yoke 1, the uppermost blade coming in direct contact with the under side of the yoke so that there can be no upward springing action away from the lowermost blade, thereby insuring the proper shearing action.

In order to manipulate the shear blades the lever or rock bar 9 is provided and which is pivotally connected intermediate its ends to the handle 3 by means of the bolt 10 or its equivalent, one end of said rock bar being provided with the curved end 11, which in this instance engages the outer surface of the shear blade arm, to which the upper shear blade is attached.

To the opposite end of the rock bar 9 is attached the rod 12 which rod extends along the handle 3 and its rear end attached to the link 13, to which link is connected the hand or grip lever 14, the link 13 is pivotally connected in any convenient and well known manner to the handle 3.

It will be understood that when the shear blades have been forced toward each other to produce a shearing action they will be automatically opened by means of the ordinary spring bow 5 by which arrangement the shear blades can be readily actuated by the hand lever or grip finger 14.

Having fully described my invention what

I claim as new and desire to secure by Letters Patent, is—

1. In a lawn trimmer, the combination with grass-shears, of a yoke provided with an operating handle and a roller, a rock-arm pivotally mounted upon the handle between the grass-shear blade arms, a draw bolt connected to the spring member of the shears forcing the shear blades of the shears against the yoke and means for actuating the rock arm, said rock arm provided with means for actuating one of the shear blades.

2. In a lawn trimmer, the combination with grass shears, of a yoke provided with an operating handle and a roller, a rock-arm pivotally connected to the handle, one end of said rock-arm located in contact with one of the shear blades, a curved draw-bolt located through the handle, said draw-bolt connected to the spring body of the shears whereby the shear blades of the shears are forced against the yoke.

In testimony that I claim the above, I have hereunto subscribed my name.

AUGUST HUBERTY.

Copies of this patent may be obtained for five cents each, by addressing the "Commissioner of Patents, Washington, D. C."